United States Patent
Tsukui et al.

(10) Patent No.: US 7,806,214 B2
(45) Date of Patent: Oct. 5, 2010

(54) CONSTRUCTION MACHINE

(75) Inventors: Hiroshi Tsukui, Abiko (JP); Tomonori Mamada, Tsukuba (JP); Hiroshi Kumagai, Toride (JP); Yasuhiro Kurumisawa, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 216 days.

(21) Appl. No.: 12/063,486

(22) PCT Filed: Oct. 13, 2006

(86) PCT No.: PCT/JP2006/320885
§ 371 (c)(1),
(2), (4) Date: Feb. 11, 2008

(87) PCT Pub. No.: WO2007/077661
PCT Pub. Date: Jul. 12, 2007

(65) Prior Publication Data
US 2009/0101375 A1 Apr. 23, 2009

(30) Foreign Application Priority Data
Dec. 26, 2005 (JP) .............................. 2005-372480

(51) Int. Cl.
*B62D 25/10* (2006.01)
(52) U.S. Cl. .................................................. 180/89.17
(58) Field of Classification Search .............. 280/89.1, 280/89.11, 89.17; 180/89.1, 89.11, 89.17; 172/776
See application file for complete search history.

(56) References Cited

U.S. PATENT DOCUMENTS

| 4,322,107 | A  | * | 3/1982 | Ishizuka et al. | ......... | 296/146.11 |
| 7,185,946 | B2 | * | 3/2007 | Cate et al. | .............. | 296/193.09 |
| 7,261,173 | B2 | * | 8/2007 | Kurtz et al. | ................. | 180/69.2 |
| 2007/0131466 | A1 | * | 6/2007 | Gutzwiller et al. | ......... | 180/89.1 |
| 2007/0187075 | A1 | * | 8/2007 | Yamada et al. | .............. | 165/135 |
| 2009/0084621 | A1 | * | 4/2009 | Giovannini et al. | ........ | 180/89.1 |

FOREIGN PATENT DOCUMENTS

| JP | 11-336124 | | 12/1999 |
| JP | 2000-64348 | | 2/2000 |
| JP | 2000-212997 | | 8/2000 |
| JP | 2002-129592 | | 5/2002 |
| JP | 2009174222 A | * | 8/2009 |

* cited by examiner

*Primary Examiner*—Faye M. Fleming
(74) *Attorney, Agent, or Firm*—Mattingly & Malur, P.C.

(57) ABSTRACT

Mounted on a revolving frame are onboard equipments including engine and heat exchanger. These onboard equipments are accommodated in a housing cover consisted by including a front partition panel. The front partition panel is fixed to a seat screw member which is provided on the revolving frame. At this time, lower end portion of the front partition panel is hung in a floated state above the revolving frame by a stopper which is adapted rest on an upper end portion of the seat screw member. Therefore, lower end portion of the front partition panel is hung in a floated state above a upper surface of a left side frame, facilitating to align a bolt through hole in the front partition panel with a nut of the seat screw member at the time of threading and tightening a bolt into the nut.

7 Claims, 16 Drawing Sheets

CONSTRUCTION MACHINE

TECHNICAL FIELD

This invention relates to a construction machine, for example, like a hydraulic excavator or a wheel loader, and more particularly to a construction machine having a housing cover for onboard equipments.

BACKGROUND ART

Generally, a hydraulic excavator, typical of construction machines, is largely constituted by an automotive vehicular lower structure, an upper revolving structure which is swingably mounted on the vehicular lower structure, and a working mechanism liftably mounted on a front portion of the upper revolving structure.

Normally, the upper revolving structure is largely constituted by a revolving frame serving as a support structure, a cab which is built on a left front portion of the revolving frame to define an operating room, a counterweight which is provided at the rear end of the revolving frame as a weight balance against the working mechanism, and a housing cover which is provided on the revolving frame on the front side of the counterweight. The housing cover is provided to accommodate onboard equipments which are mounted on the revolving frame, including an engine, hydraulic pump and heat exchanger (e.g., see Japanese Patent Laid-Open No. 2000-64348 and 2002-129592).

In the case of hydraulic excavators of the prior arts, normally a housing cover is fixed on a revolving frame by means of seat screw members which are fixed by welding or the like. At the time of fixing a housing cover on a revolving frame, bolts are threaded into seat screw members through bolt through holes which are provided in the housing cover.

In this regard, since the housing cover is a heavy structure, normally it becomes necessary to put the housing cover tentatively on top of the revolving frame, while bringing a bolt or bolts into alignment with a seat screw member or members prior to threading and tightening the bolts into the latter.

On such an occasion, normally anti-corrosive sealing material is provided at joint portions of the revolving frame and each seat screw member, for sealing the joint portions against corrosion which might develop at joint portions of the revolving frame and seat screw members when not coated with a paint to a sufficient degree.

However, when setting a bolt threaded into the housing cover in position to the seat screw member on the revolving frame, the housing cover is inadvertently put on top of the revolving frame in some cases, bringing the lower end of the housing cover into contact with the sealing material on the revolving frame to cause damages to the sealing material.

DISCLOSURE OF THE INVENTION

In view of the above-discussed problem with the prior art, it is an object of the present invention to provide a construction machine which is arranged particularly to prevent a partition panel from contacting a frame at the time of attaching the partition panel to a seat screw member on the frame, permitting to mount the partition panel efficiently in a facilitated manner.

It is another object of the present invention to provide a construction machine which is arranged particularly to facilitate alignment of a partition panel with a seat screw member on a frame, permitting to mount the partition panel efficiently in position on the frame.

In order to achieve the above-stated objectives, the present invention is applied to a construction machine which includes a frame which constitutes a support structure, onboard equipments mounted on the support frame including an engine and a heat exchanger, a housing cover including a partition panel and internally defining a machine room to accommodate the onboard equipments, and a seat screw member provided on the frame for fixing the partition panel thereon.

(1) The construction machine according to the present invention is characterized in that the partition panel is provided with a bolt through hole to insert a bolt and a stopper adapted to rest on an upper end of the seat screw member on the frame, hanging a lower end of the partition panel in a floated state above the frame while threading and tightening the bolt into the seat screw member through the bolt through hole for fixing the partition panel to the seat screw member.

With the arrangements just described, at the time of fixing a partition panel to a seat screw member which is provided on a frame, the stopper on the partition panel can be placed to rest on an upper end of a seat screw member, letting a lower end of the partition panel hang down in a floated state above the frame. Therefore, the bolt through hole in the partition panel can be easily brought into an aligned position relative to the seat screw member at the time of fixing the partition panel to the seat screw member by threading a bolt into the seat screw member through the bolt through hole in the partition panel. Thus, the partition panel can be fixed to the seat screw member efficiently in a facilitated manner. Besides, the lower end of the partition panel can be kept out of contact with the frame for protection of an anti-corrosion sealing material or coating which is applied or formed on a top surface of the frame.

(2) According to the present invention, the stopper is located at a level lower than a height of the seat screw member. Accordingly, when the stopper is put to rest on an upper end of the seat screw member, the lower end of the partition panel is hung down always in a floated state above the top surface of the frame.

(3) Further, according to the present invention, the partition panel is constituted by an upright plate portion erected on upward and downward directions, and a bent edge portion formed by bending a side portion of the upright plate portion and provided with the bolt through hole, and the stopper is securely fixed on the upright plate portion at a position higher than the bolt through hole and in a lower corner portion adjoining the bent edge portion to serve also as a reinforcing member for the partition panel.

In this case, after putting the stopper on top of the seat screw member, the bolt in the bolt through hole of the partition panel can be easily threaded into the seat screw member. Besides, since the stopper is securely fixed to both of the upright plate portion and bent edge portion of the partition panel, it can be utilized as a reinforcing means enhancing the rigidity of the partition panel as a whole.

(4) Further, according to the present invention, the seat screw member is constituted by a plate member erected on the frame, and a nut securely fixed on the plate member at a position corresponding to said bolt through hole of said partition panel, and the stopper is located at a level lower than a height of the plate member.

In this case, lower end of the partition panel can be kept in a floated state above the frame simply by putting the partition panel to rest on the plate member of the seat screw member erected on the frame, permitting to align the position of the bolt through hole in the partition panel with the nut of the seat screw member surely in a facilitated and efficient way.

Therefore, the bolt in the bolt through hole can be easily threaded into and tightened with the nut of the seat screw member, while lower end of the partition panel kept in a floated state above the frame, permitting to mount the partition panel efficiently in a facilitated manner.

(5) Further, according to the present invention, the construction machine further comprises a door hinged on the partition panel and provided with a stay which is engageable with the stopper to lock the door in an open position.

In this case, a stay on a door can be hooked on the stopper on the partition panel to lock the door in an open position. Since the stopper which is provided on the partition panel can be utilized also as a stay catch member, there is no need for adding a part exclusively for the purpose of catching a stay of the door. That is to say, it becomes possible to reduce the number of parts.

(6) Further, according to the present invention, the construction machine further comprises an anti-corrosive sealing material applied around a joint portion of the frame and the seat screw member, the sealing material being protected from and kept out of contact with a lower end of the partition panel by the stopper holding the lower end of the partition panel in a floated state above the frame.

In this case, by the use of the stopper, a lower end of the partition panel can be hung in a floated state above the frame while tentatively setting the partition panel in position relative to the seat screw member. Therefore, the anti-corrosion sealing material which is applied around a joint portion of the frame and the seat screw member can be kept out of contact with the lower end of the partition panel. That is to say, a joint portion of the frame and seat screw member can be maintained in a corrosion-proof state over a long period of time, keeping the exterior of the machine in good conditions.

(7) Further, according to the present invention, the construction machine further comprises a cab mounted on a front portion of the frame on the front side of the housing cover, the partition panel being employed as a member for partitioning off the housing cover from the rear side of the cab, permitting to mount the partition panel efficiently in position which partition off the housing cover on the rear side of the cab.

BEST MODE FOR CARRYING OUT THE INVENTION

Figure 1:
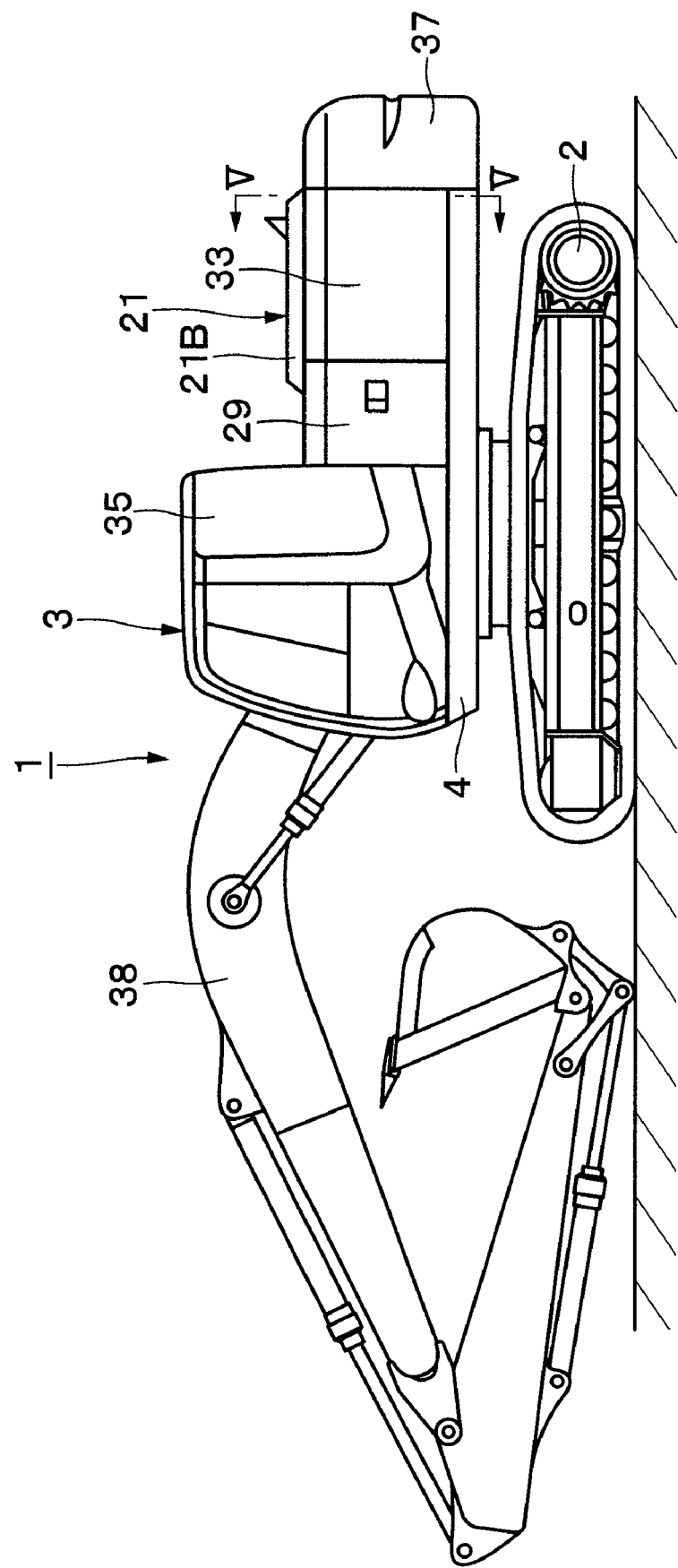
FIG. 1 is a front view of a hydraulic excavator embodying the present invention.
Figure 2:
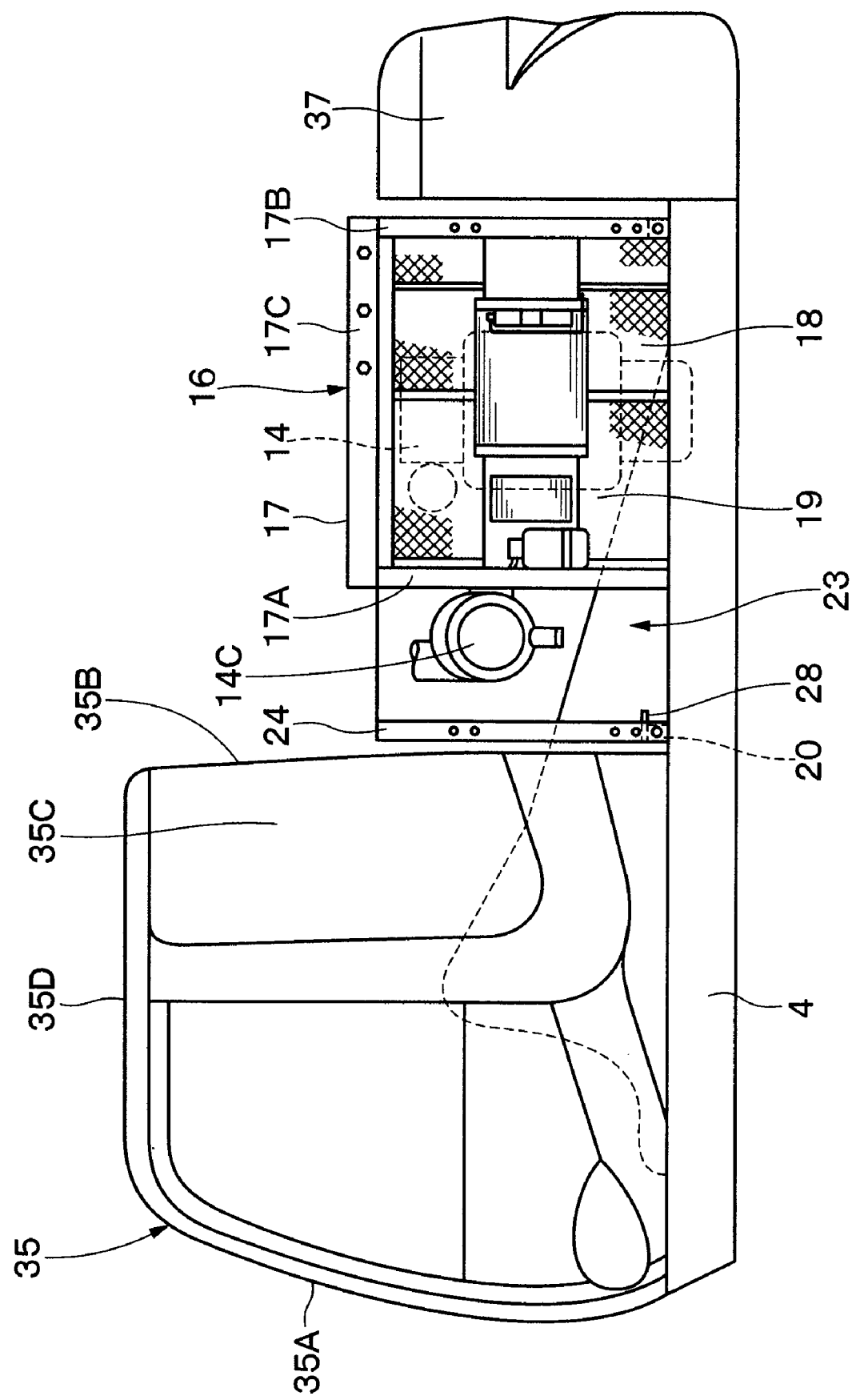
FIG. 2 is an enlarged front view of an upper revolving structure of the hydraulic excavator, with front and rear doors removed.

Hereafter, with reference to FIGS. 1 through 16, the present invention is described more particularly by way of its preferred embodiments in which the present invention is applied to a hydraulic excavator, a typical example of construction machines.

In the drawings, indicated at 1 is a hydraulic excavator which is largely constituted by a crawler type vehicular lower structure 2, an upper revolving structure 3 which is rotatably mounted on the vehicular lower structure 2, and a working mechanism 38 liftably mounted on a front side portion of the upper revolving structure 3, for example, for carrying out a ground excavating operation, as described in greater detail hereinafter. The upper revolving structure 3 includes a revolving frame 4, engine 14, heat exchanger 16, housing cover 21, cab 35 and counterweight 37, which will be described hereinafter.

Figure 3:
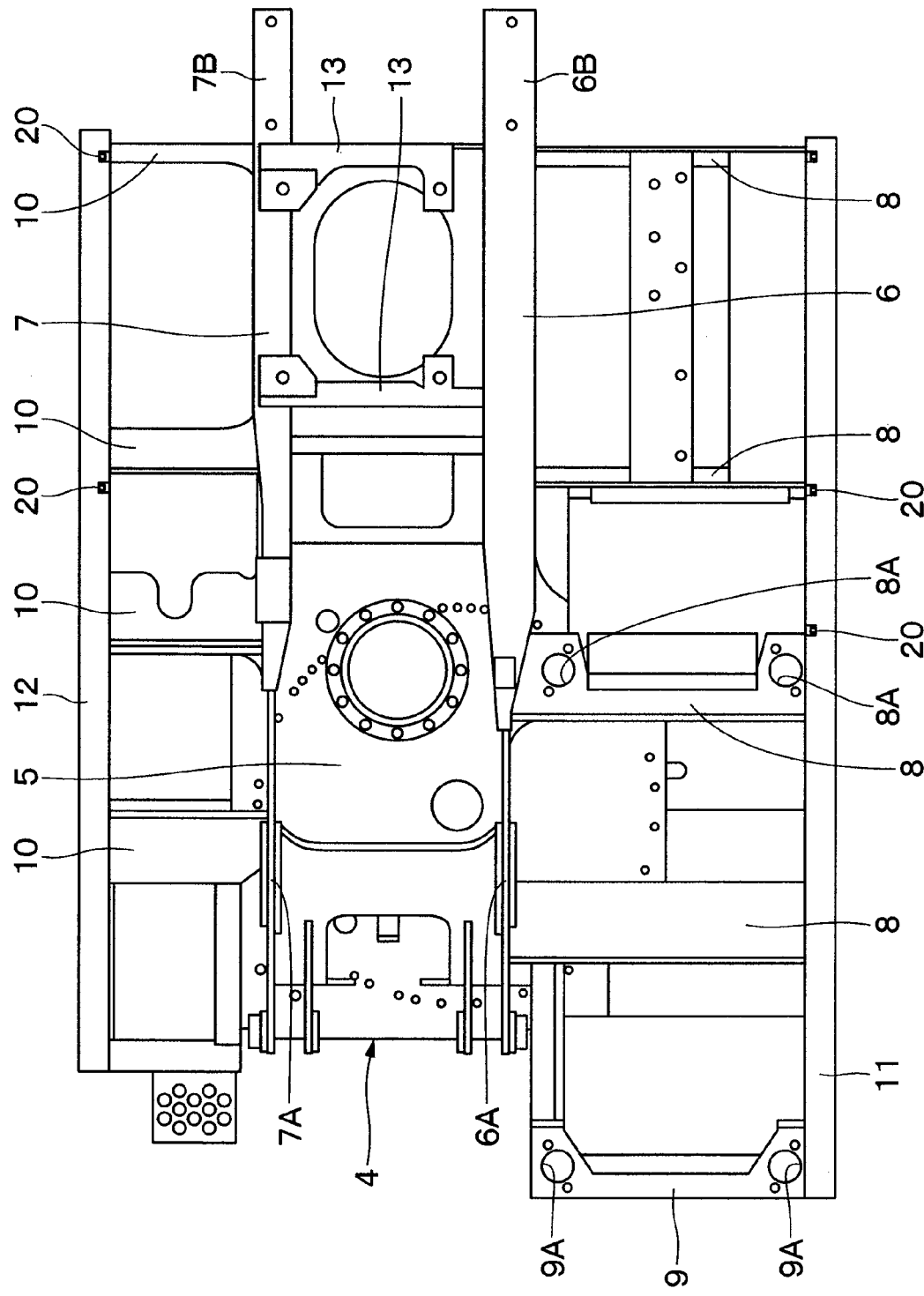
FIG. 3 is a plan view of a revolving frame alone.
Figure 9:
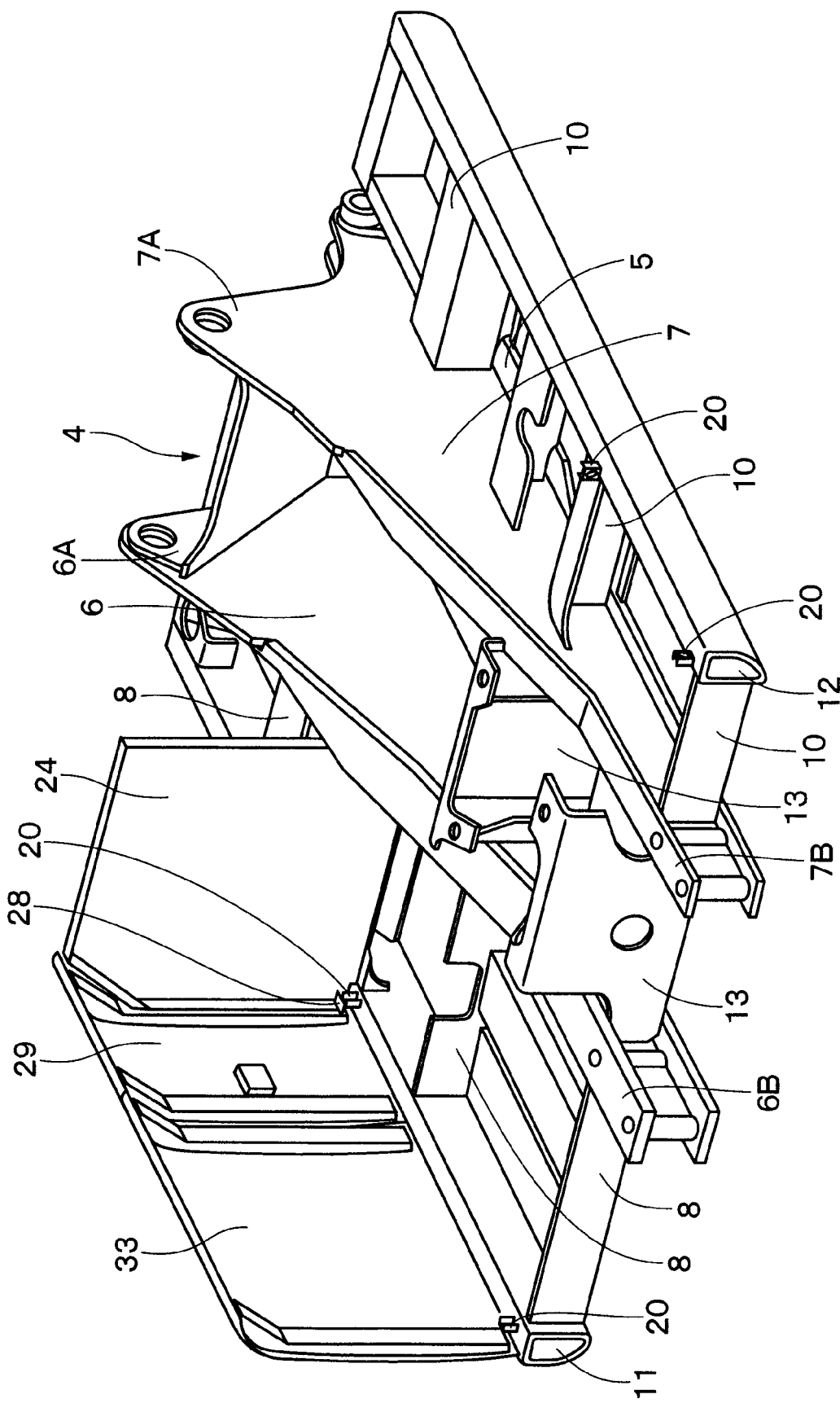
FIG. 9 is a perspective view of the revolving frame, taken obliquely from rear side, showing front partition panel and front and rear doors which are mounted on the revolving frame.

Indicated at 4 is a revolving frame serving as a base frame of the upper revolving structure 3 and constituted by a strong support structure which is swingably mounted on the vehicular lower structure 2. In this instance, as shown in FIGS. 3 and 9, the revolving frame 4 is constituted by a bottom plate 5, left vertical plate 6, right vertical plate 7, left side frame 11 and right side frame 12, which will be described hereinafter.

Denoted at 5 is a bottom plate of the revolving frame 4. This bottom plate 5 is formed of a thick steel plate and located in a center portion of the revolving frame 4. In this instance, the bottom plate 5 is formed broader in the front side for mounting a revolving wheel, and narrower in a rear side. Erected in a rear side portion of the bottom plate 5 are left and right vertical plates 6 and 7 as described below.

Indicated at 6 is a left vertical plate which is erected on top of the bottom plate 5 in such a way as to extend from a left front portion to a left rear portion of the bottom plate 5. On the other hand, indicated at 7 is a right vertical plate which is erected on top of the bottom plate 5 in such a way as to extend from a right front portion to a right rear portion of the bottom plate 5. These left and right vertical plates 6 and 7 are secured to the top side of the bottom plate 5 by welding, and extended in forward and rearward directions, confronting and keeping a uniform spacing therebetween in transverse direction. Attached to front ends of the left and right vertical plates 6 and 7 are brackets 6A and 7A for mounting a working mechanism 38, which will be described later on. Further, rear ends of the left and right vertical plates 6 and 7 are projected rearward of the bottom plate 5 to form counterweight mount portions 6B and 7B for mounting thereon a counterweight 37, which will be described hereinafter.

Designated at 8 are a plural number of left extension beams which are provided at left side of the bottom plate 5. The left extension beams 8 are provided at intervals along the left side of the bottom plate 5 and projected leftward from the bottom plate 5. A left side frame 11, which will be described hereinafter, is securely fixed to projected outer ends of the left extension beams 8. A couple of cab mount portions 8A are provided in transversely spaced positions on one left extension beam 8 which is located at a median position in the longitudinal direction of the bottom plate 5. To these cab mount portions 8A, a rear end of a cab 35 is fixed through a mount member (not shown) as will be described in greater detail hereinafter.

Indicated at 9 is a cab support frame which is extended out on the left front side of the bottom plate 5. This cab support frame 9 is formed substantially in L-shape, and securely fixed to the bottom plate 5 at its right side. At the left side, the cab support frame 9 is securely fixed to a left side frame 11 which will be described hereinafter. A couple of cab mount portions 9A are provided at transversely spaced positions in a front portion of the cab support frame 9. To these cab mount portions 9A, a front end of a cab 35 is securely fixed through a mount member (not shown) as will be described in greater detail hereinafter.

Denoted at 10 are a plural number of right extension beams which are provided at right side of the bottom plate 5. The right extension beams 10 are provided at intervals along the right side of the bottom plate 5, and projected rightward from the bottom plate 5. A right side frame 12, which will be described hereinafter, is securely fixed to projected outer ends of the right extension beams 10.

Indicated at 11 is a left side frame which is located on the left side of the bottom plate 5. For example, this left side frame 11 is formed of a D-type frame which is in D-shape in section, and extended in forward and rearward directions along the bottom plate 5. The left side frame 11 which is securely fixed to outer ends of the left extension beams 8 is connected to the bottom plate 5 through the respective left extension beams 8. Further, the left side of the cab support frame 9 is securely fixed to a front end portion of the left side frame 11.

Indicated at 12 is a right side frame which is located on the right side of the bottom plate 5. For example, this right side frame 12 is formed of a D-type frame which is in D-shape in section, and extended in forward and rearward directions along the bottom plate 5. The right side frame 12 which is securely fixed to outer ends of the right extension beams 10 is connected to the bottom plate 5 through the respective right extension beams 10.

Designated at 13 are front and rear engine support brackets which are erected in a rear side portion of the bottom plate 5 between the left and right vertical plates 6 and 7 to support thereon an engine 14 which will be described hereinafter. These engine support brackets 13 are located forward of the counterweight mount portions 6B and 7B of the left and right vertical plates 6 and 7, and securely fixed to the bottom plate 5 and the left and right vertical plates 6 and 7 by welding.

Figure 4:
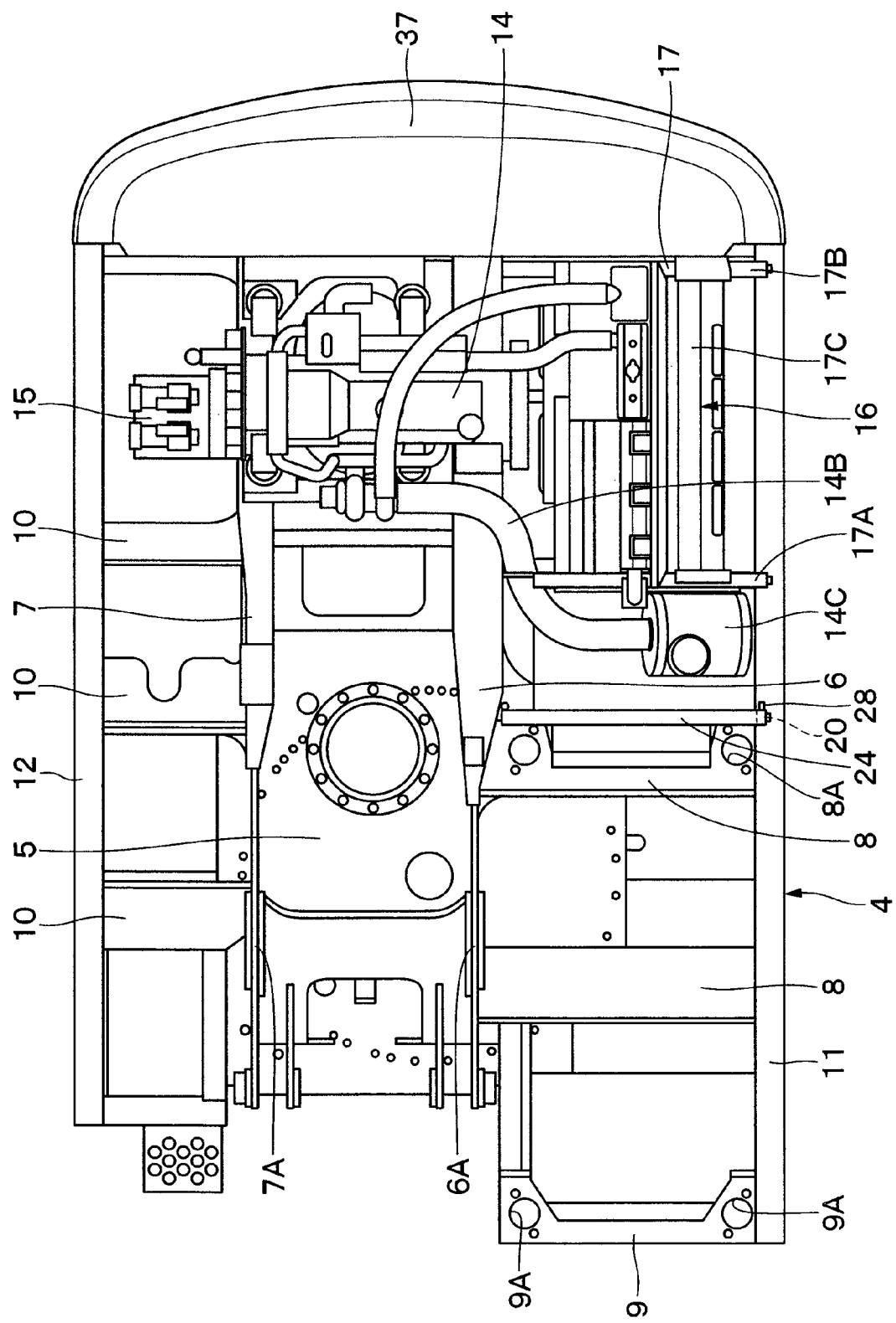
FIG. 4 is a plan view showing an engine, heat exchanger and counterweight which are mounted on the revolving frame.
Figure 5:
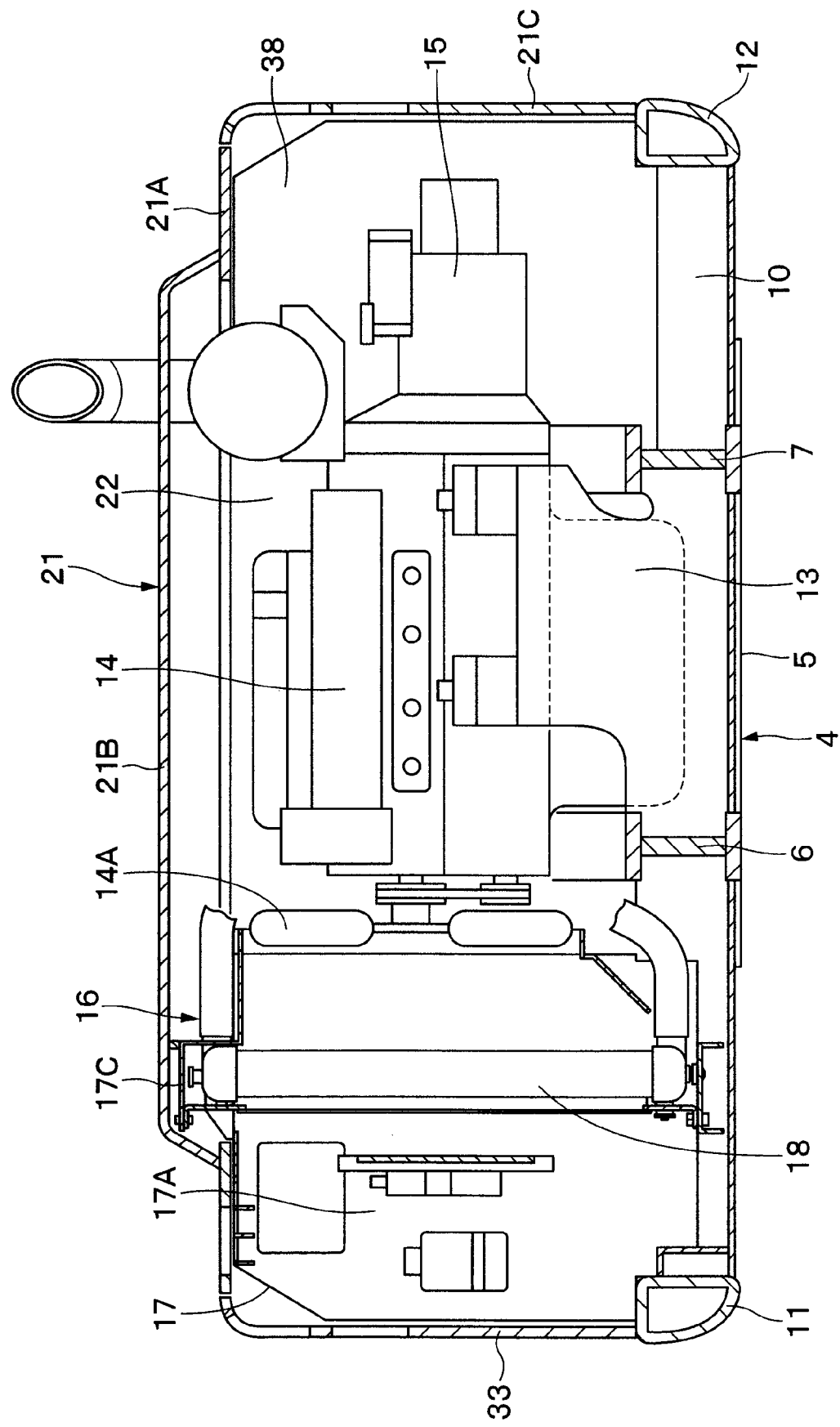
FIG. 5 is a sectional view of the engine, heat exchanger and housing cover, taken in the direction of arrows V-V of FIG. 1.
Figure 6:
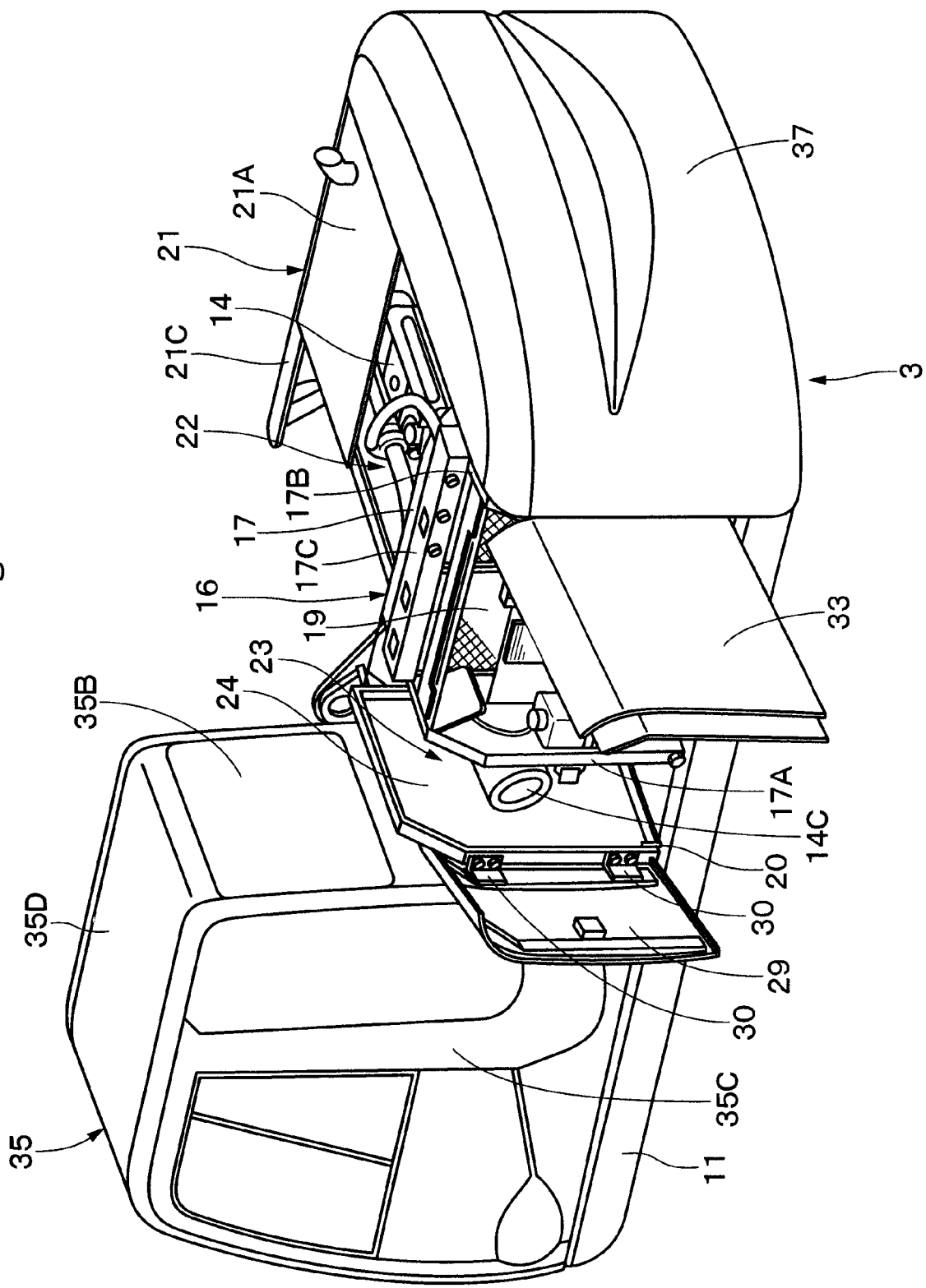
FIG. 6 is a perspective view of the upper revolving structure, taken obliquely from rear side, with front and rear doors respectively in an open position.
Figure 7:
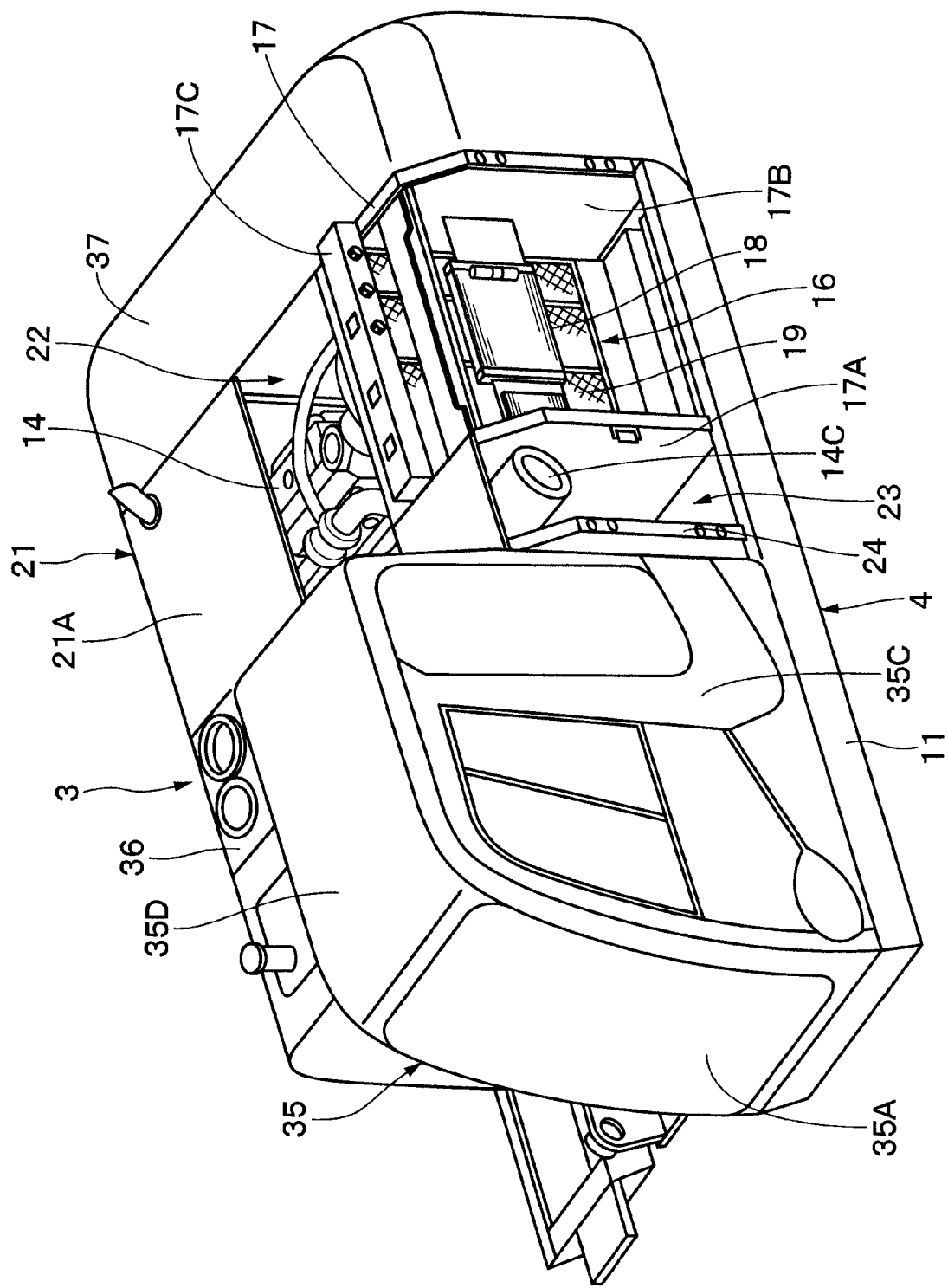
FIG. 7 is a perspective view of the upper revolving structure, taken obliquely from front side, with front and rear doors removed.

Indicated at 14 is an engine which is mounted on the support brackets 13 of the revolving frame 4 on the front side of the counterweight 37, as an onboard equipment. As shown in FIGS. 4 and 5, the engine 14 is positioned transversely to extend laterally in leftward and rightward directions. A cooling fan 14A is located on the left side of the engine 14, while a hydraulic pump 15 is located on the right side of the engine 14 to supply pressure oil to various hydraulic actuators which mounted on the hydraulic excavator 1. Further, an air cleaner 14C is attached to a distal end of an intake pipe 14B which is connected to the engine 14. As seen in FIGS. 6 and 7, the air cleaner 14C is accommodated in a utility room 23, which will be described hereinafter.

Figure 8:
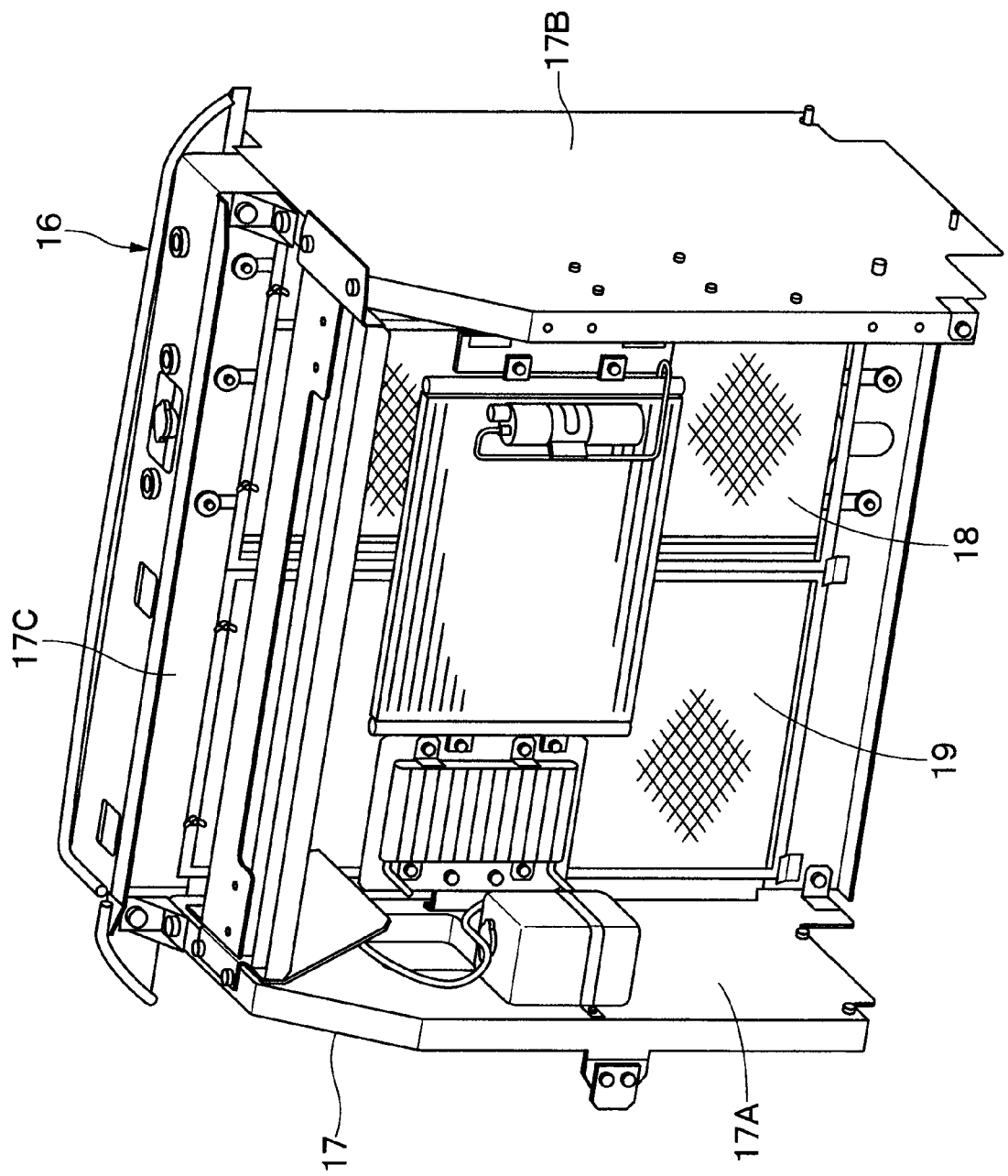
FIG. 8 is a perspective view of the heat exchanger alone.

Denoted at 16 is a heat exchanger which is mounted on the revolving frame 4 on the left side of the engine 14, as another onboard equipment. As shown in FIGS. 6 to 8, the heat exchanger 16 is provided as a single unit and removably mounted on the revolving frame 4. In this instance, the heat exchanger 16 is comprised of a box-like support frame structure 17, and various heat exchange equipments which are supported on the support frame structure 17, including a radiator 18 and oil cooler 19, for example.

The support frame structure 17 of the heat exchanger 16 is fixed on the revolving frame 4 on the rear side of a front partition panel 24 which will be described hereinafter. Further, the support frame structure 17 is largely constituted by a front partition plate 17A which is located on the rear side of the front partition panel 24 in confronting relation therewith, a rear partition plate 17B which is located on the rear side of the front partition plate 17A in confronting relation therewith, and a upper plate 17C bridging upper ends of the front and rear partition plates 17A and 17B.

In this instance, along with the above-mentioned radiator 18 which cools off engine cooling water, the oil cooler 19 which cools off operating oil is mounted between the front and rear partition plates 17A and 17B of the support frame structure 17. The front partition plate 17A partitions off rear side of the utility room 23, which will be described later on, while the rear partition plate 17B partitions off left rear side (front side of the counterweight 37) of the housing cover 21 which will also be described hereinafter.

Indicated at 20 are a plural number of seat screw members which are securely fixed on the left and right side frames 11 and 12. These seat screw members 20 are provided, for example, for fixing a front partition panel 24, which will be described later (see FIG. 9).

Figure 11:
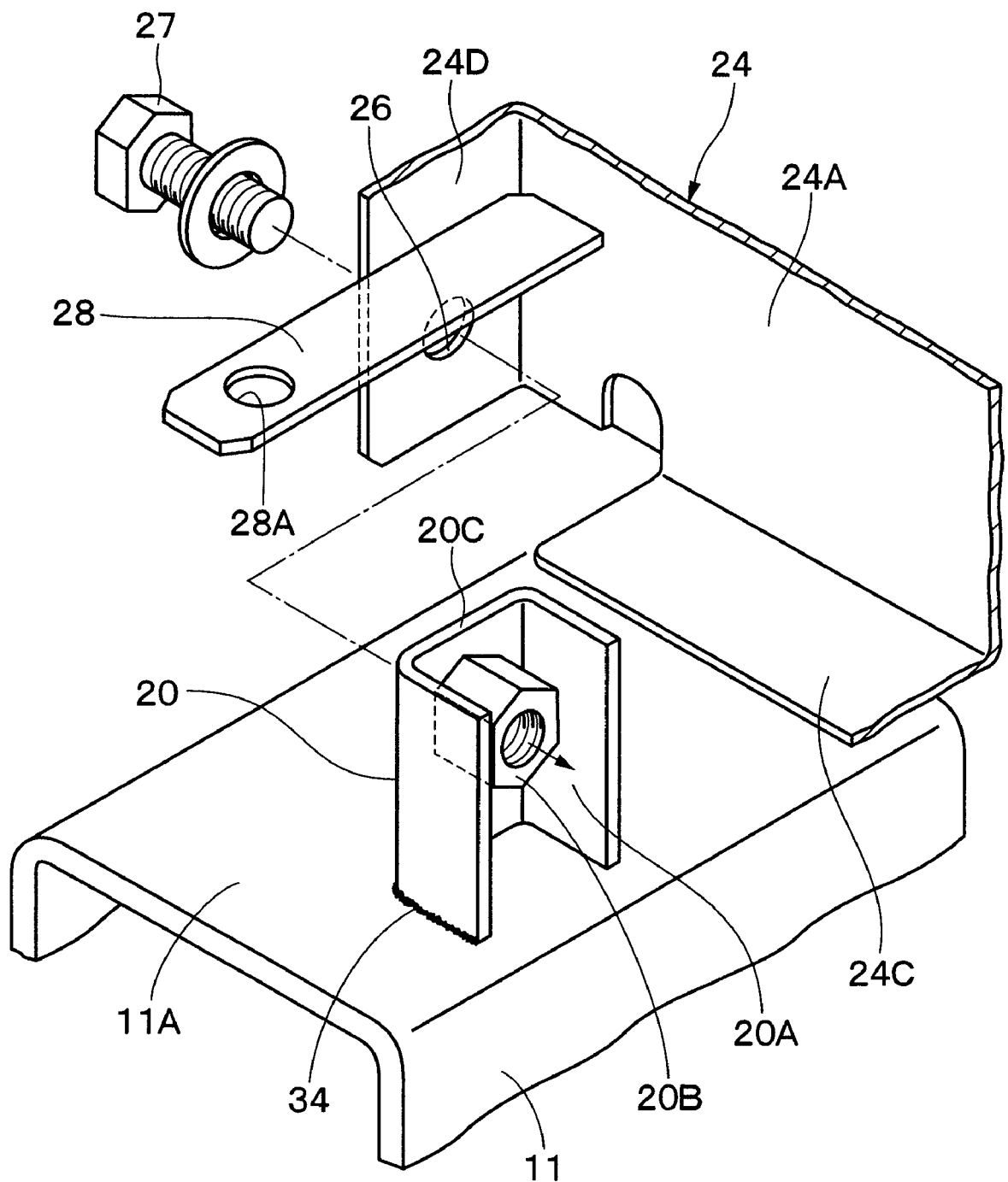
FIG. 11 is an exploded view showing on an enlarged scale of the seat screw member, front partition panel and stopper shown in FIG. 10.
Figure 14:
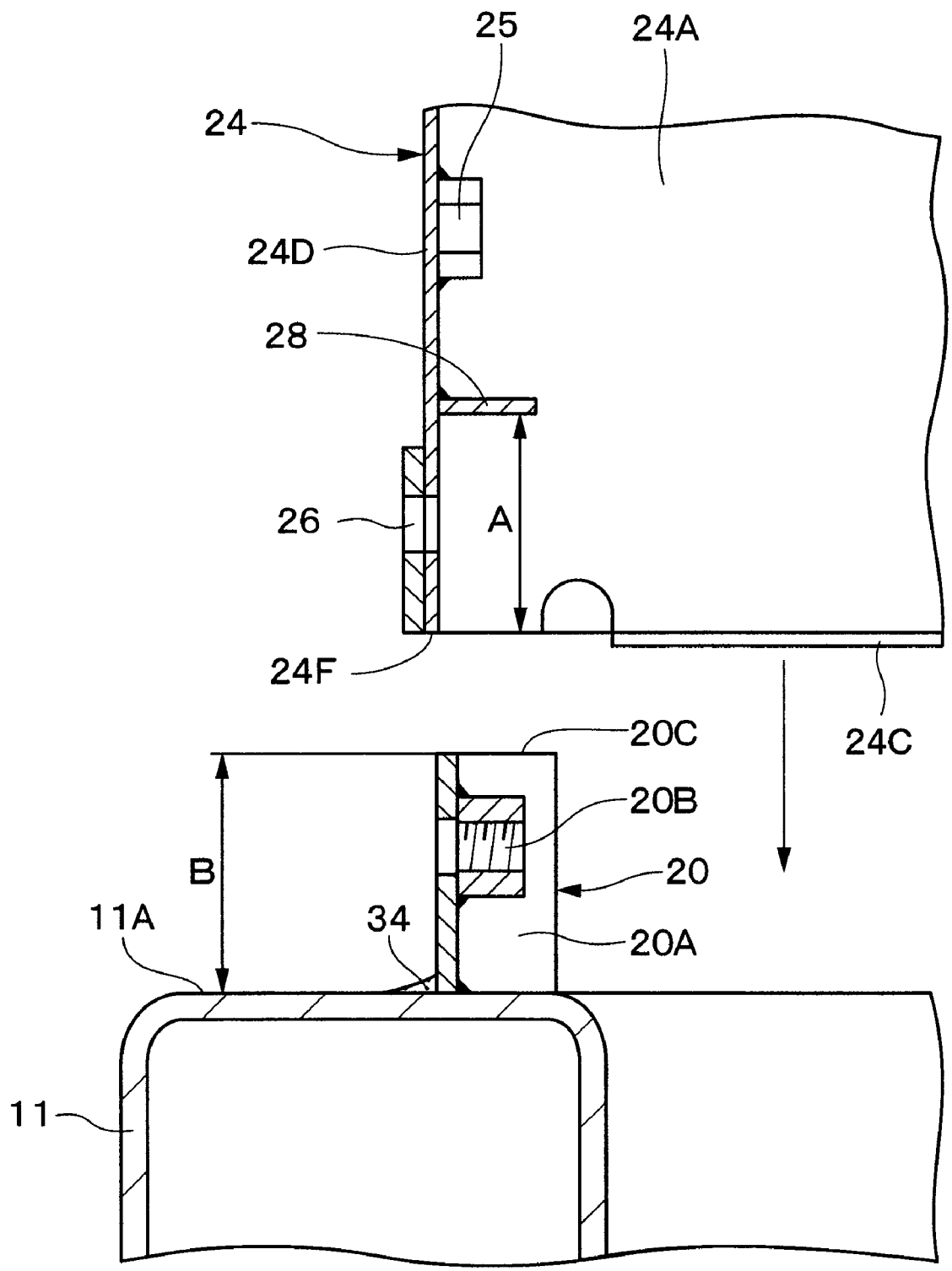
FIG. 14 is an enlarged sectional view of the front partition panel being lowered toward a seat screw member.

In this instance, as shown in FIGS. 11 and 14, a seat screw member 20 which is fixedly provided on the left side frame 11 is constituted by a folded plate 20A as a plate member which is formed, for example, by bending a steel plate into U-shape in section, a nut 20B which is securely fixed on the folded plate 20A by welding or the like. The lower end of the folded plate 20A of the seat screw member 20 is securely fixed on the upper surface 11A of the left side frame 11 by welding or the like.

Indicated at 21 is a housing cover which is provided on the revolving frame 4, on the front side of the counterweight 37 which will be described hereinafter. As shown in FIG. 5, the housing cover 21 accommodates the onboard equipments on the revolving frame 4, including the engine 14, hydraulic pump 15 and heat exchanger 16. In this instance, as shown in FIGS. 1 and 5 to 7, the housing cover 21 is composed of a top panel 21A, bonnet 21B, right door 21C and support frame structure 17 of the heat exchanger 16, as well as the front partition panel 24, left front door 29 and left rear door 33 which will be described later on.

The housing cover 21 is partitioned off by the top panel 21A and bonnet 21B on the top side, by the right door 21C on the right side and by the left front door 29 and left rear door 33 on the left side, respectively. On the front side, the housing cover 21 is partitioned off by the front partition panel 24 and an operating oil tank 36 which will be described later. Further, on the rear side, the housing cover 21 is partitioned off by the rear partition plate 17B of the support frame structure 17 of the heat exchanger 16 and front of the counterweight 37.

Indicated at 22 is a machine room which is provided within the housing cover 21. As shown in FIGS. 5 to 7, the machine room 22 is defined by the top panel 21, bonnet 21B, right door 21C, left rear door 33, support frame structure 17 of the heat exchanger 16, operating oil tank 36, and counterweight 37 to accommodate the engine 14, hydraulic pump 15 and heat exchanger 16. The machine room 22 can be opened and closed by way of the right door 21C and the left rear door 33.

Denoted at 23 is a utility room which is provided within the housing cover 21 along with the machine room 22. As shown in FIGS. 5 to 7, the utility room 23 is defined by the front partition plate 17A of the support frame structure 17 of the heat exchanger 16, and front partition panel 24 and left front door 29 which will be described later on. In addition to the air cleaner 14C of the engine 14, for example, the utility room 23 adapted to accommodate a grease gun and a tool box (both of them are not shown). The utility room 23 can be opened and closed by way of the left front door 29.

Indicated at 24 is a front partition panel which is provided on the rear side of a cab 35 which will be described hereinafter. This front partition panel 24 constitutes part of the housing cover 21. Further, the front partition panel 24 is located in a confronting position relative to a rear side 35B of the cab 35, which will be described hereinafter, partitioning a left front side of the housing cover 21 from the rear side 35B of the cab 35. In this instance, as shown in FIGS. 9 to 13, the front partition panel 24 is formed in a flat rectangular shape as a whole, for example, by bending a steel plate. More particularly, the front partition panel 24 is constituted by a rectangular upright plate portion 24A erected on vertically and bordered by bent edges at four sides thereof, including an upper bent edge portion 24B, a lower bent edge portion 24C, a left bent edge portion 24D and a right bent edge portion 24E.

Figure 10:
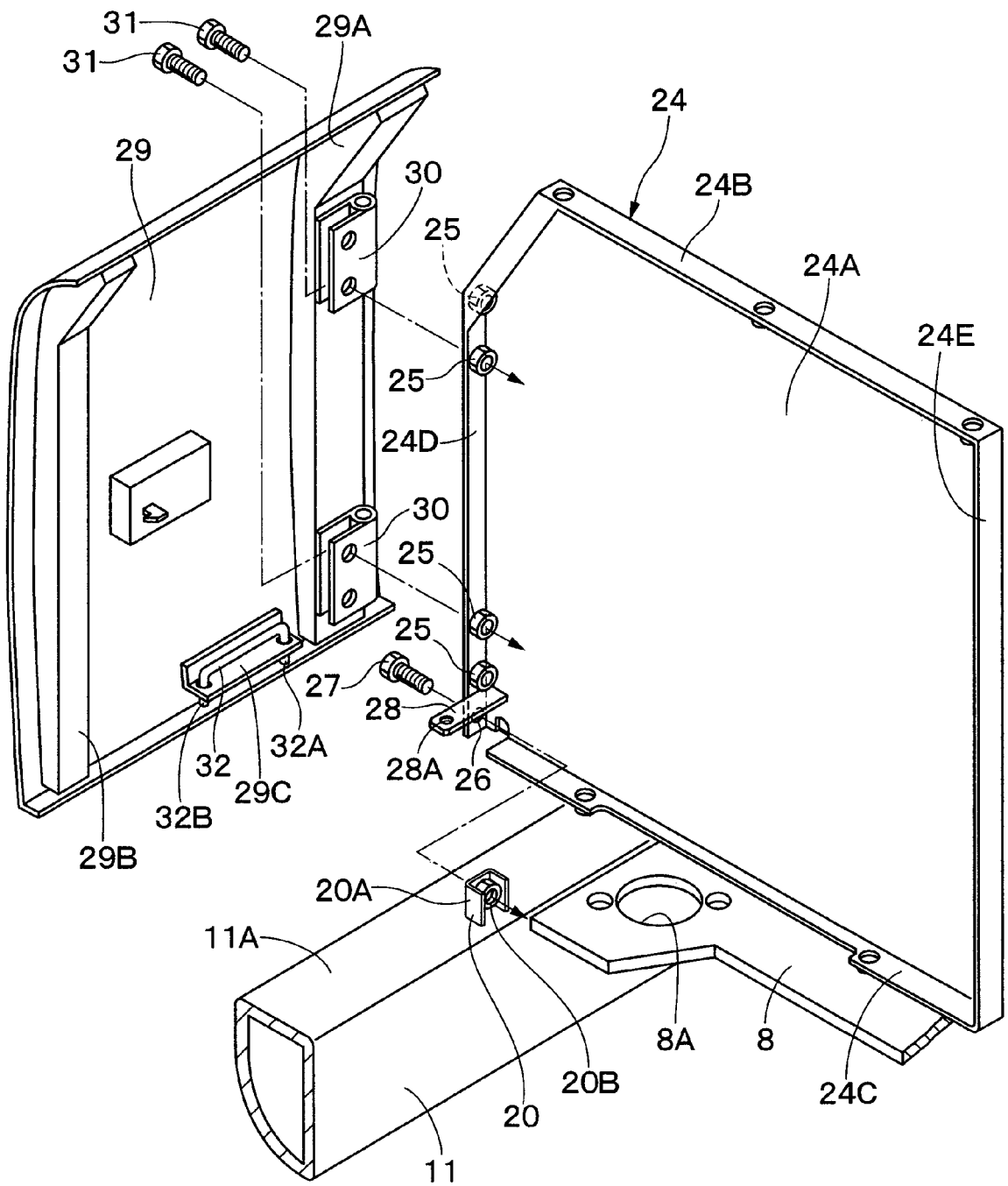
FIG. 10 is an exploded view of a seat screw member, front partition panel and front door, taken from rear side.

In this instance, four nuts 25 in total are welded in vertically spaced positions on the left bent edge portion 24D of the front partition panel 24 for fitting a left front door 29 which will be described hereinafter. Besides, a bolt through hole 26 is bored in a lower end portion of the left bent edge portion 24D. As shown in FIGS. 10 and 11, a bolt 27 is put in the bolt through hole 26 in the left bent edge portion 24D, and the front partition panel 24 is fastened to the seat screw member 20 by threading the bolt 27 into the nut 20B of the seat screw member 20 on the left side frame 11.

Denoted at 28 is a stopper which is provided on the front partition panel 24 on the upper side of the bolt through hole 26. As shown in FIG. 11, this stopper 28 is formed of a steel plate and in the shape of a flat rectangular strip extending in a direction away from the front partition panel 24. The stopper 28 is securely welded to a corner portion between the lower side of the upright plate portion 24A and the left bent edge portion 24D of the front partition panel 24, slightly upward of the bolt through hole 26.

In this instance, as shown in FIG. 14, the lower side of the stopper 28 is located at a height A from a lower end portion 24F of the front partition panel 24, which is slightly smaller (lower) than a height B of the upper end portion 20C of the seat screw member 20 from the upper surface 11A of the left side frame 11, that is, in the relations of A<B.

Figure 15:
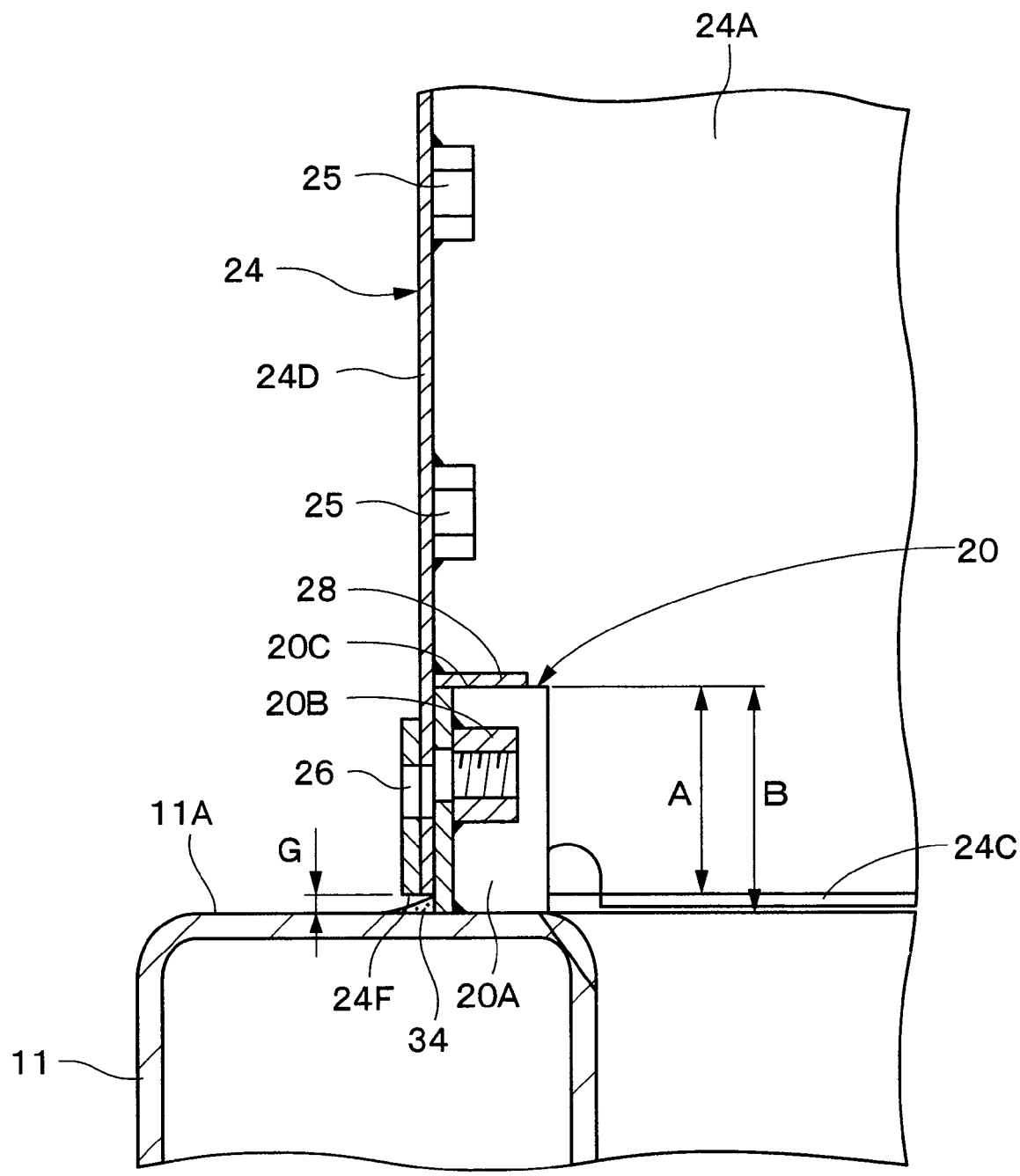
FIG. 15 is a sectional view in the same position as FIG. 14, showing a stopper of the front partition panel which is placed to rest on the seat screw member.

Therefore, when the front partition panel 24 is put on the upper end portion 20C of the seat screw member 20 as shown in FIG. 15 and so forth, a gap space G is left between the lower end portion 24F of the front partition panel 24 and the upper surface 11A of the left side frame 11 to hold the lower end portion 24F of the front partition panel 24 in a floated state above the upper surface 11A of the left side frame 11.

In this manner, by the stopper 28, the heavy front partition panel 24 can be held in a floated state above the gap space G at the time of fastening same to the seat screw member 20, preventing the lower end portion 24F of the front partition panel 24 from contacting the upper surface 11A of the left side frame 11, for protection of a sealing material 34 which is applied on the upper surface 11A of the left side frame 11 as described hereinafter.

Figure 16:
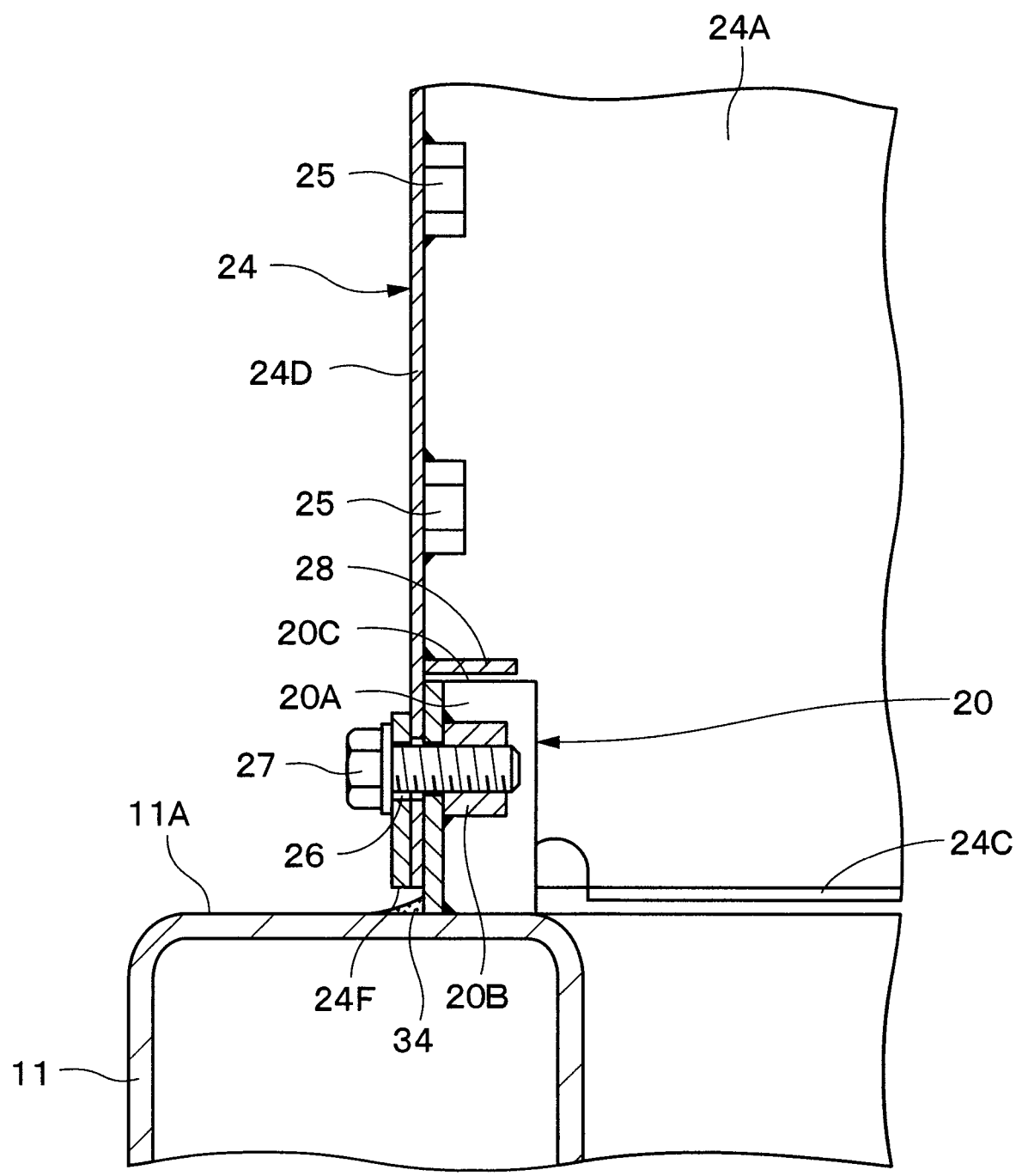
FIG. 16 is a sectional view in the same position as FIG. 14, showing the front partition panel which is fastened to the seat screw member by the use of a bolt.

Further, as shown in FIG. 15, while holding the stopper 28 on the upper end portion 20C of the seat screw member 20, the bolt through hole 26 of the front partition panel 24 can be easily set in an aligned position relative to the nut 20B on the seat screw member 20. Thus, as shown in FIG. 16, the bolt 27 in the bolt through hole 26 can be easily threaded into the nut 20B on the seat screw member 20.

Further, since the stopper 28 is securely fixed to both of the upright plate portion 24A and the left bent edge portion 24D (in a corner portion) of the front partition panel 24 by welding, for example, it also functions as a reinforcing member for enhancing the rigidity of the front partition panel 24 as a whole.

Denoted at 28A is a stay through hole which is provided in a distal end portion of the stopper 28, which is projected in a rearward direction from the front partition panel 24, to releasably hold the other end 32B of a stay 32 which will be described hereinafter.

Figure 12:
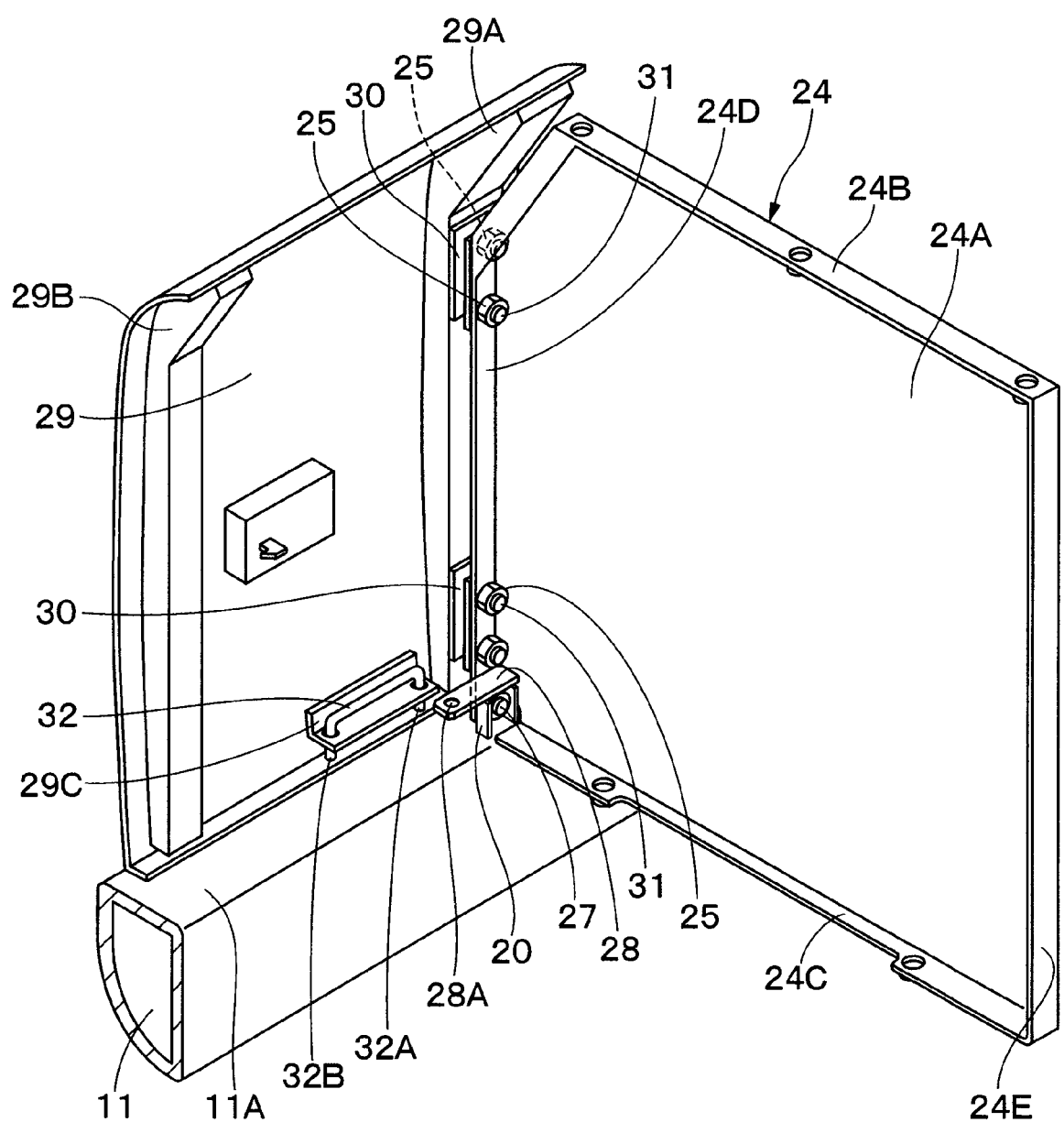
FIG. 12 is a perspective view, taken from rear side, showing the front door in a closed position.
Figure 13:
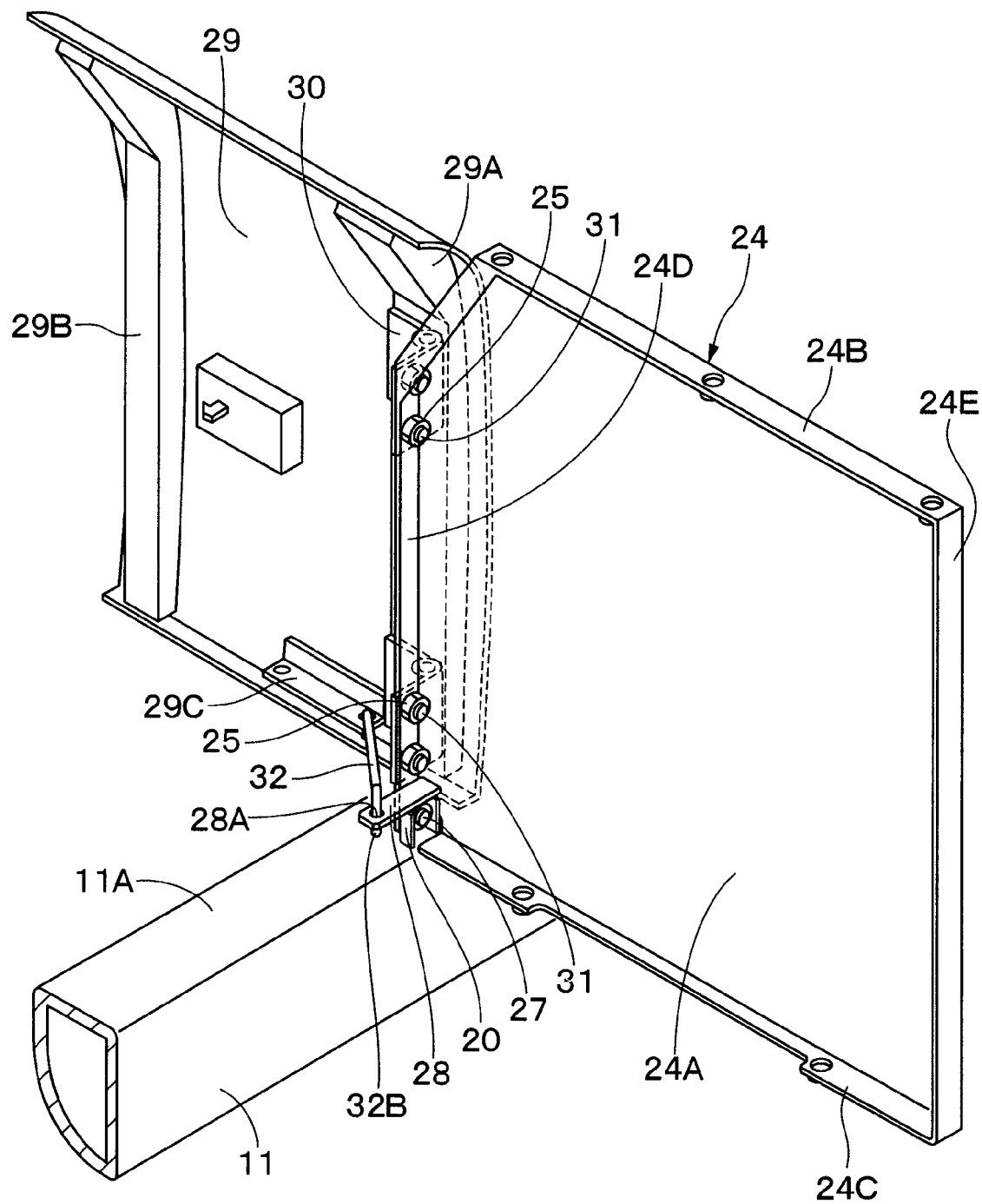
FIG. 13 is a perspective view, taken from rear side, showing the front door in an opened position.

Indicated at 29 is a left front door which is hinged on the front partition panel 24 to open and close the utility room 23. In this instance, as shown in FIGS. 9, 12 and 13, this left front door 29 is formed, for example, in a flat rectangular shape as a whole by the use of a steel plate and arranged to rise upward from the revolving frame 4 substantially to the same level as the front partition panel 24. Front and rear reinforcing members 29A and 29B in the form of vertically extending pillars are attached on the inner side of the left front door 29. Further, on the inner side of the left front door 29, a stay holder 29C of an L-shape in section is securely fixed on a lower end portion of the left front door 29 to hold a stay 32, which will be described hereinafter.

Indicated at 30 are upper and lower hinge members which are provided between the front partition panel 24 and the left front door 29. At one end, these hinges 30 are securely fixed to the front reinforcing member 29A which is fixed on the inner side of the left front door 29. At the other end, by the use of bolts 31, the hinges 30 are fastened to nuts 25 which is fixed on the left bent edge portion 24D of the front partition panel 24. Thus, the left front door 29 is attached to the front partition panel 24 swingably supported on the hinges 30, and movable between a closed position substantially in parallel relation with the left side frame 11 as shown in FIG. 12 and an open position substantially in orthogonal relation with the left side frame 11 as shown in FIGS. 6 and 13. Thus, the left front door 29 serves to open and close the utility room 23 which is formed within the housing cover 21.

Indicated at 32 is a stay which is retained in the stay holder 29C of the left front door 29. This stay 32 serves to hold the left front door 29 in an open position as shown in FIG. 13, and, for example, in the form of a steel rod which is bent in a shallow U-shape as a whole.

In this instance, the one end 32A of the stay 32 is loosely fitted in the stay holder 29C in a locked state in vertical direction, and retained on the left front door 29 through the stay holder 29C. On the other hand, the other end 32B of the stay 32 is a free end which is liftably and extractably retained in the stay holder 29C. Thus, the other end 32B of the stay 32 can be lifted out of the stay holder 29C to turn the stay 32 about the vertically locked end 32A.

When the left front door 29 is opened from the closed position shown in FIG. 12 to the open position shown in FIG. 13, the other end 32B of the stay 32 is extracted from the stay holder 29C and put in the stay through hole 28A of the stopper 28 which is projected from the front partition panel 24. As a consequence, the other end 32B of the stay 32 is hooked in the stay through hole 28A of the stopper 28, and the left front door 29 is kept in an open state (in an open position) by way of the stay 32.

Designated at 33 is a left rear door which is located behind the left front door 29 to open and close the machine room 22. In this instance, substantially in the same way as the above-described left front door 29, the left rear door 33 is formed in a flat rectangular shape as a whole by the use of a steel plate (FIGS. 6 and 9). The left rear door 33 is pivotally supported on the rear partition plate 17B of the support frame structure 17 of the heat exchanger 16 through hinge members (not shown), forming double doors together with the left front door 29 for opening and closing the machine room 22 in the housing cover 21 from the side of the heat exchanger 16 as shown in FIG. 6.

Indicated at 34 is a sealing material which is applied between the left side frame 11 and the seat screw member 20. As shown in FIGS. 11, 14 etc., the sealing material 34 is a filler like putty or plastic which is applied to joint portions of the upper surface 11A of the left side frame 11 and the folded plate 20A of the seat screw member 20. The sealing material 34 serves to improve the exterior of the hydraulic excavator 1 by preventing corrosion which would occur at the joints of the upper surface 11A of the left side frame 11 and the folded plate 20A of the seat screw members 20 in case the joint portions are not coated with a paint in a sufficient degree.

Indicated at 35 is a cab which is provided on a left front portion of the revolving frame 4. The cab 35 is enclosed by front section 35A, rear section 35B, left and right side sections 35C and upper section 35D, which define an operating room. In this instance, as shown in FIG. 3, the cab 35 is fixed on the cab mount portions 8A on the left extension beam 8 and on the cab mount portions 9A on the cab support frame 9 through a mount member (not shown). The rear section 35B of the cab 35 is confronted face to face by the front partition panel 24 which is located on the rear side of the cab 35 (FIG. 6).

Denoted at 36 is an operating oil tank which is located on a right front portion of the revolving frame 4. This operating oil tank 36 stores operating oil to be supplied to various hydraulic actuators of the hydraulic excavator 1. In this case, right front side of the housing cover 21 is partitioned off by the operating oil tank 36.

Indicated at 37 is a counterweight which is located at the rear end of the revolving frame 4, on the rear side of the engine 14, as a weight balance against the working mechanism 38 which will be described hereinafter. The counterweight 37 is mounted on the counterweight mount portions 6B and 7B on the left and right vertical plates 6 and 7 of the revolving frame 4 in such a way as to partition off a right rear side of the housing cover 21.

Indicated at 38 is a working mechanism which is mounted on a front portion of the revolving frame 4, on the right side of the cab 35, to carry out a ground digging or working operation. Base end of the working mechanism 38 is pivotally mounted on the brackets 6A and 7A of the left and right vertical plates 6 and 7 of the revolving frame 4 to turn the fore end of the lifting boom up and down relative to the revolving frame 4.

Being arranged in the manner as described above, the hydraulic excavator 1 according to the present embodiment can be driven to a working site by the vehicular lower structure 2 and carry out a ground digging operation by means of the working mechanism 38 on the upper revolving structure 3 which is put in swinging movements.

In the case of the present embodiment, the stopper 28 which is provided on the front partition panel 24 makes it possible to attach the front partition panel 24 to the seat screw member 20 on the revolving frame 4 (left side frame 11) in an efficient and facilitated manner. While referring to FIGS. 14 to 16, an explanation for the attachment operation of the front partition panel 24 will now be given.

In the first place, the front partition panel 24 is lowered toward the left side frame 11 as shown in FIG. 14, and then the stopper 28 of the front partition panel 24 is put on the upper end of the seat screw member 20 which is provided on the left side frame 11 as shown in FIG. 15. As explained hereinbefore, the height of the lower side of the stopper 28 from the lower end portion 24F of the front partition panel 24 is set at a value A which is slightly smaller than a height B of the upper end portion 20C of the seat screw member 20 from the upper surface 11A of the left side frame 11.

Therefore, a gap space G is left between the lower end portion 24F of the front partition panel 24 and the upper surface 11A of the left side frame 11, permitting the front partition panel 24 to stay in a floated state above the left side frame 11. In this state, the lower end portion 24F of the front partition panel 24 is prevented from inadvertently coming into contact with the upper surface 11A of the left side frame 11, for protection of the anti-corrosion sealing material 34 which is applied around joint portions of the seat screw members 20 with the upper surface 11A of the left side frame 11.

Further, while letting the stopper 28 rest on the upper end portion 20C of the seat screw member 20 as shown in FIG. 15, the bolt through hole 26 in the front partition panel 24 can be almost brought into aligned position relative to the nut 20B of the seat screw member 20 on the left side frame 11. That is to say, at the time of fixing the front partition panel 24 on the left side frame 11 of the revolving frame 4 by way of the seat screw members 20, a bolt 27 which is placed in a bolt through hole 26 can be easily threaded into a nut 20B of a seat screw member 20 simply by lifting the front partition panel 24 slightly in an upward direction, as shown in FIG. 16.

After fixing the front partition panel 24 on the revolving frame 4, the other end of each hinge member 30 is fixed to the left bent edge portion 24D of the front partition panel 24 by the use of bolts 31 as shown in FIG. 10. By so doing, the left front door 29 is pivotally attached to the front partition panel 24 by means of the respective hinge members 30. Thus, the left front door 29 can be swung between the closed position of FIG. 12 and the open position of FIG. 13 to open and close the utility room 23 which is formed between the machine room 22 and the cab 35.

In this instance, when the left front door 29 is swung open to the position shown in FIG. 13, the other end 32B of the stay 32 which is retained in the stay holder 29C on the left front door 29 is placed in the stay through hole 28A which is provided in the stopper 28 on the side of the front partition panel 24. By so doing, the other end 32B of the stay 32 is hooked in the stay through hole 28A in the stopper 28 to keep the left front door 29 in the open position.

In this manner, the left front door 29 can be locked in the open position by hooking the other end 32B of the stay 32 in the stopper 28 which is provided on the front partition panel 24. Thus, as compared with a case where an additional member is employed simply for hooking the other end 32B of the stay 32, it becomes possible to cut the number of parts and the production cost.

Thus, according to the present embodiment, the stopper 28 which is provided on the front partition panel 24 can be put on the upper end portion 20C of the seat screw member 20 on the left side frame 11 to hold the lower end portion 24F of the front partition panel 24 in a floated state above the upper surface 11A of the left side frame 11 to facilitate alignment of the bolt through holes 26 in the front partition panel 24 with the nuts 20B of the seat screw members 20. Thus, despite the heavy weight, the front partition panel 24 can be fixed to the seat screw members 20 easily in an efficient manner.

Further, as shown in FIG. 15, an anti-corrosive sealing material 34 is applied around joint portions of the upper surface 11A of the left side frame 11 and the seat screw members 20. However, since the lower end portion 24F of the front partition panel 24 can be held in a floated state above the upper surface 11A of the left side frame 11 by the stopper 28 as mentioned above, there is no possibility of the sealing material 34 being damaged by contact with the lower end portion 24F of the front partition panel 24 to the upper surface 11A of the left side frame 11. Thus, through protection of the sealing material 34 which is applied around joint portions of the upper surface 11A of the left side frame 11 and the seat screw members 20, the exterior of the hydraulic excavator 1 can be kept in good conditions.

Further, since the stopper 28 is welded in position in a corner portion where the upright plate portion 24A of the front partition panel 24 meets the left bent edge portion 24D, it also contributes to enhance the rigidity of the front partition panel 24.

Furthermore, the stopper 28 is provided with the stay through hole 28A in its projected end portion, so that, when the left front door 29 which is attached to the front partition panel 24 is swung open, the other end 32B of the stay 32 on the left front door 29 can be placed in the stay through hole 28A as shown in FIG. 13 to lock the left front door 29 in the open position through the stopper 28. That is to say, the stopper 28 serves also as a hooking member for anchoring the other end 32B of the stay 32, making it possible to reduce the number of parts as compared with a case where an additional part is required exclusively for hooking the other end 32B of the stay 32.

Further, in the above-described embodiment, by way of example, the front partition panel 24 as a cover, which is partitioned off the left front side of the housing cover 21, is attached to the seat screw member 20. However, needless to say, the present invention is not limited to the particular example shown. For example, the invention can be similarly applied to other panels of the housing cover 21. In case a right front partition panel is employed to partition off a right front side of the housing cover 21 in place of the operating oil tank 36, for example, the invention can be similarly applied to such a right front partition panel. Further, in a case where a rear partition panel is provided to partition off the rear side of the housing cover 21 in place of the counterweight 37, the invention can also be applied to such a rear partition panel. Furthermore, in a case where a center partition panel is located in a center portion of the housing cover 21 in place of the support frame structure 17 of the heat exchanger 16, the invention is also applicable to such a center partition panel.

Moreover, in the above-described embodiment, by way of example the other end 32B of the stay 32 is hooked in the stay through hole 28A which is bored in a projected end portion of the stopper 28. However, the present invention is not limited to this particular example. For example, a hook may be provided on the stopper to catch the other end 32B of the stay 32.

Further, in the above-described embodiment, the invention is applied to a hydraulic excavator 1, a typical example of construction machine. However, the present invention is similarly applicable to other construction machines including hydraulic cranes, wheel loaders, bulldozers etc.

The invention claimed is:

1. A construction machine having a frame which constitutes a support structure, onboard equipment mounted on said frame, including an engine and a heat exchanger, a housing cover including a partition panel and internally defining a machine room to accommodate said onboard equipment, and a seat screw member provided on said frame for fixing said partition panel thereon, characterized in that:

said partition panel is provided with a bolt through hole which receives a bolt, and a stopper adapted to rest on an upper end of said seat screw member on said frame, wherein a lower end of said partition panel hangs in a floating state above said frame while said bolt is threaded and tightened into said seat screw member through said bolt through hole for fixing said partition panel to said seat screw member.

2. A construction machine as defined in claim 1, wherein said stopper is located at a height from a bottom of said partition panel which is less than a height of the upper end of said seat screw member from a top of said frame.

3. A construction machine as defined in claim 1, wherein said partition panel is constituted by an upright plate portion erected in upward and downward directions, and a bent edge portion formed by bending a side portion of said upright plate portion and provided with said bolt through hole; and said stopper is securely fixed on said upright plate portion at a position higher than said bolt through hole and in a lower corner portion adjoining said bent edge portion to serve also as a reinforcing member for said partition panel.

4. A construction machine as defined in claim 1, wherein said seat screw member is constituted by a plate member erected on said frame and a nut securely fixed on said plate member at a position corresponding to said bolt through hole of said partition panel, and said stopper is located at a height from a bottom of said partition panel which is less than a height of the upper end of said plate member from a top of said frame.

5. A construction machine as defined in claim 1, further comprising a door hinged on said partition panel and provided with a stay which is engageable with said stopper to lock said door in an open position.

6. A construction machine as defined in claim 1, further comprising an anti-corrosion sealing material applied around a joint portion of said frame and said seat screw member, said sealing material being protected from and kept out of contact with a lower end of said partition panel by said stopper holding said lower end of said partition panel in a floating state above said frame.

7. A construction machine as defined in claim 1, further comprising a cab mounted on a front portion of said frame on the front side of said housing cover, said partition panel being employed as a member for partitioning off said housing cover from the rear side of said cab.

* * * * *